(12) United States Patent
Nemeth-Nagy et al.

(10) Patent No.: US 11,904,821 B2
(45) Date of Patent: Feb. 20, 2024

(54) ELECTRONIC PARKING BRAKE DEVICE AND METHOD FOR OPERATING AN ELECTRONIC PARKING BRAKE DEVICE

(71) Applicant: KNORR-BREMSE Systeme fuer Nutzfahrzeuge GmbH, Munich (DE)

(72) Inventors: David Nemeth-Nagy, Budapest (HU); András Fuchs, Paty (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 475 days.

(21) Appl. No.: 17/275,470

(22) PCT Filed: Sep. 10, 2019

(86) PCT No.: PCT/EP2019/074051
§ 371 (c)(1),
(2) Date: Mar. 11, 2021

(87) PCT Pub. No.: WO2020/058030
PCT Pub. Date: Mar. 26, 2020

(65) Prior Publication Data
US 2021/0370900 A1 Dec. 2, 2021

(30) Foreign Application Priority Data

Sep. 19, 2018 (DE) .......................... 102018122953.4

(51) Int. Cl.
*B60T 13/62* (2006.01)
*B60T 7/10* (2006.01)
(Continued)

(52) U.S. Cl.
CPC .............. *B60T 13/62* (2013.01); *B60T 7/107* (2013.01); *B60T 7/20* (2013.01); *B60T 13/385* (2013.01);
(Continued)

(58) Field of Classification Search
CPC ........ B60T 13/62; B60T 7/107; B60T 15/041; B60T 13/385; B60T 13/683; B60T 13/662; B60T 7/20
See application file for complete search history.

(56) References Cited

U.S. PATENT DOCUMENTS

| 5,061,015 A | 10/1991 | Cramer et al. |
| 7,204,563 B2 | 4/2007 | Soupal |

(Continued)

FOREIGN PATENT DOCUMENTS

| DE | 102006036748 A1 | 2/2008 |
| DE | 102006041009 A1 | 3/2008 |

(Continued)

*Primary Examiner* — Pamela Rodriguez
(74) *Attorney, Agent, or Firm* — Cheryl L. Greenly; Brian E. Kondas (57) ABSTRACT

The present invention relates to an electronic parking brake device for a vehicle, in particular a utility vehicle. As a function of at least one operating state of a towing vehicle parking brake supply line and/or a trailer parking brake supply line, a towing vehicle parking brake control valve is activatable by a control unit in such a way that a towing vehicle parking brake supply line can be deaerated or aerated by the towing vehicle parking brake control valve. By manually actuating a trailer parking brake control element, a trailer parking brake control valve is activatable by the control unit in such a way that a trailer parking brake supply line can be deaerated or aerated by the trailer parking brake control valve. The present invention also relates to a method for operating the above electronic parking brake device for a vehicle.

15 Claims, 2 Drawing Sheets

(51) Int. Cl.
  *B60T 7/20*   (2006.01)
  *B60T 13/38*  (2006.01)
  *B60T 13/66*  (2006.01)
  *B60T 13/68*  (2006.01)
  *B60T 15/04*  (2006.01)

(52) U.S. Cl.
  CPC .......... *B60T 13/662* (2013.01); *B60T 13/683* (2013.01); *B60T 15/041* (2013.01)

(56) References Cited

U.S. PATENT DOCUMENTS

| | | |
|---|---|---|
| 8,152,243 B2 | 4/2012 | Bensch et al. |
| 8,197,014 B2 | 6/2012 | Bensch et al. |
| 8,282,173 B2 | 10/2012 | Forster et al. |
| 9,604,606 B2 | 3/2017 | Hilberer |
| 10,946,848 B2 * | 3/2021 | Van Thiel ............ B60T 13/683 |
| 10,953,859 B2 | 3/2021 | Griesser et al. |
| 2005/0029859 A1 * | 2/2005 | Bensch ................ B60T 17/221 |
| | | 303/20 |
| 2018/0251111 A1 | 9/2018 | Schnittger et al. |

FOREIGN PATENT DOCUMENTS

| | | |
|---|---|---|
| DE | 102006054433 A1 | 5/2008 |
| DE | 102007047691 A1 | 4/2009 |
| DE | 102005043607 B4 | 3/2015 |
| EP | 1923286 B1 | 11/2007 |
| EP | 2927067 B1 | 1/2015 |
| EP | 2942249 B1 | 4/2015 |
| WO | 2017076892 A1 | 5/2017 |
| WO | 2017076893 A1 | 5/2017 |

\* cited by examiner

ELECTRONIC PARKING BRAKE DEVICE AND METHOD FOR OPERATING AN ELECTRONIC PARKING BRAKE DEVICE

FIELD OF THE INVENTION

The present invention relates to an electronic parking brake device for a vehicle, in particular a utility vehicle, having at least one manually actuatable electrical towing vehicle parking brake control element, having at least one manually actuatable electrical trailer parking brake control element, and having at least one electronic control unit.

The present invention also relates to a method for operating such an electronic parking brake device for a vehicle, in particular a utility vehicle.

BACKGROUND OF THE INVENTION

In some regions of the world, such as the United States of America, the manual activation of the parking brake device of the towing vehicle and trailer is carried out from the vehicle driver's cab. For this purpose, the corresponding manual parking brake control device has a separate control element for the towing vehicle and for the trailer vehicle or the trailer. With regard to safe vehicle operation, this design requires different framework conditions than, for example, in Europe, where the manual parking brake control device is generally designed as a single device having a correspondingly larger function assignment.

In terms of a cost-optimized design of parking brake devices in commercial vehicles, subsections of these devices are increasingly being electrified or expanded or replaced with electronic components. By saving pneumatic or electropneumatic parking brake control elements within the driver's cab of the utility vehicle, the pneumatic interconnection complexity can be reduced, resulting in a cost-optimized parking brake device.

Such electronic parking brake devices having electrical or electronic parking brake actuating devices are already known from the prior art.

Thus, U.S. Pat. No. 7,204,563 B2 discloses a braking system for a towing vehicle consisting of a service braking system and a parking braking system. The service and parking braking system is used to brake a tractor and a trailer that is being pulled by the tractor. A trailer manual control valve is actuated by a vehicle driver to brake the trailer. The parking braking system has a parking brake control valve that receives commands input by the vehicle driver to apply and release the parking brakes on the tractor and the trailer.

Furthermore, DE 10 2005 043 607 A1 discloses a method for controlling an electrical parking brake of a utility vehicle having an electronic control unit and a manual control unit communicating with the electronic control unit, via which driver requests dependent on the type of actuation of the manual control unit are transmitted to the electronic control unit. According to the invention, it is provided that the parking brake is closed due to an action carried out by the driver of the utility vehicle which is not connected to the actuation of the manual control unit.

In addition, DE 10 2006 036 748 A1 discloses an electrically controlled braking system for a towing vehicle connectable to a trailer, having an anti-jackknifing brake actuatable by means of a manual operating element and only acting on the brakes of the trailer. The operating element is designed as an electrical element, by means of which an electrical signal for controlling a valve device can be generated, by means of which the braking force of the anti-jackknifing brake can be influenced.

Furthermore, WO 2017/076892 A1 discloses a pneumatic braking device for a commercial vehicle having at least one pneumatically activatable spring accumulator for a parking brake of the commercial vehicle and having an electronic parking brake device, having at least one control electronics unit, at least one bistable valve unit, at least one first valve unit, by means of which, when the parking brake of the utility vehicle is activated, a parking brake of a trailer of the utility vehicle can be deactivated, at least one second valve device which can be interconnected in such a way that when the system pressure drops to supply the parking brake of the trailer, the parking brake of the trailer can be activated, and having a towing vehicle protection valve.

Furthermore, WO 2017/076893 A1 discloses a pneumatic braking device for a commercial vehicle having at least one pneumatically activatable spring accumulator for a parking brake of the commercial vehicle having an electronic parking brake device, having at least one control electronics unit, at least one first bistable valve unit and at least one second bistable valve unit, at least one valve device which can be interconnected in such a way that when the system pressure drops to supply a parking brake of a trailer of the towing vehicle, the parking brake of the trailer can be activated, and having a towing vehicle protection valve.

Due to the structural design of the parking brake devices in the prior art, they are still complexly designed and sometimes complex to operate for the vehicle driver.

OBJECT OF THE INVENTION

The object of the present invention is to refine an electronic parking brake device of the type mentioned at the outset in an advantageous manner, in particular in such a way that the electronic parking brake device has a simpler structure, is more cost-effective, is safer to operate, and/or is actuatable or controllable more intuitively for a vehicle driver.

This object is achieved according to the invention by an electronic parking brake device. According to this, it is provided that an electronic parking brake device for a vehicle, in particular a utility vehicle, having at least one manually operated, electrical towing vehicle parking brake control element, having at least one manually actuatable, electrical trailer parking brake control element having at least one electronic control unit, having at least one pneumatic towing vehicle parking brake control valve, having at least one pneumatic trailer parking brake control valve, having at least one towing vehicle parking brake supply line, and having at least one trailer parking brake supply line, wherein in dependence on at least one operating state of the towing vehicle parking brake supply line and/or the trailer parking brake supply line: by manually actuating the towing vehicle parking brake control element, the towing vehicle parking brake control valve is activatable by means of the control unit in such a way that the towing vehicle parking brake supply line can be deaerated or aerated by the at least one towing vehicle parking brake control valve; and/or by manually actuating the trailer parking brake control element, the trailer parking brake control valve is activatable by means of the control unit in such a way that the trailer parking brake supply line can be deaerated or aerated by the at least one trailer parking brake control valve.

The invention is based on the basic concept that in a parking brake device having two control elements, which are usually designed as pneumatic or electropneumatic control elements, these control elements are to be replaced by electrical or electronic control elements. These control elements or actuating devices are usually arranged (for example in the USA) in a driver's cab or vehicle cabin of a utility vehicle on its dashboard near the steering wheel. The electrical towing vehicle parking brake control element and the electrical trailer parking brake control element are each designed as monostable control elements. The use of manual electrical control or actuating elements has the further advantage that they only communicate with one control unit and, as a result, the assignment of a manually set actuating signal with regard to the activation or release of the parking brake device is only carried out by the control unit. With this type of electrical interconnection, on the one hand, the fixed assignment of a specific switching state of the manual switching elements to a specific operating state of the parking brake device can be canceled. On the other hand, this type of decoupling allows a specific switching state of the manual control elements to be assigned to different operating states of the parking brake device, depending on which operating state the parking brake device is in at the time before the manual actuation. In this way, in particular the complexity of the manual switching elements can be reduced and, furthermore, the operation or actuation of these elements can be assigned more intuitively and easily for a vehicle driver. Such manual elements can be designed, for example, as a pivotable lever, a rotary switch, a button, a rocker switch, a linearly movable slide, or a linearly movable pushbutton, a linearly movable pull button, or a linearly movable push-pull button. Moreover, by providing two separate control elements for the towing vehicle and trailer, a lesser functional assignment is required per control element, which results in a simpler and clearer operation of the parking brake device for the vehicle driver.

The towing vehicle parking brake control valve can also be advantageously designed as a towing vehicle parking brake solenoid control valve. Furthermore, the towing vehicle parking brake control valve can be designed as a bistable towing vehicle parking brake control valve. Therefore, it is also conceivable that the trailer parking brake control valve is advantageously designed as a trailer parking brake solenoid control valve. In addition, the trailer parking brake control valve can be designed as a bistable trailer parking brake control valve.

The towing vehicle parking brake control valve can furthermore also be part of a towing vehicle parking brake control valve arrangement consisting of multiple such parking brake control valves. The towing vehicle parking brake supply line can then be aerated or deaerated by the towing vehicle parking brake control valve arrangement in combination with one or more relay valves.

Accordingly, the trailer parking brake control valve can also be part of a trailer parking brake control valve arrangement consisting of multiple such parking brake control valves. The trailer parking brake supply line can then be aerated or deaerated by the trailer parking brake control valve arrangement in combination with one or more relay valves.

Accordingly, a relay valve can be arranged in the trailer parking brake supply line and/or in the towing vehicle parking brake supply line. Thus, an air volume-boosting valve can be provided in the trailer parking brake supply line and/or in the towing vehicle parking brake supply line.

Moreover, it can be provided that the towing vehicle parking brake control element and the trailer parking brake actuating element each have a current-conducting actuated state and a current-blocking neutral state. The current-conducting actuated state should be understood to mean that a circuit is closed as a result of manual actuation by a vehicle driver and a corresponding actuation or control signal is transmitted to the control unit. Accordingly, the current-blocking state or neutral state is a non-manually actuated state of the control elements, so that the control elements cannot generate a current-conducting state and, accordingly, no control signal is transmitted to the control unit. The two control elements are designed as normal current-blocking control elements. This means that in a non-manually actuated state they are not current-conducting and therefore cannot transmit an actuating signal or control signal to the control unit. Such an unambiguous state assignment of the control elements enables the vehicle driver to actuate the electronic parking brake device to reduce errors, so that the overall safety of the utility vehicle can be increased as a result. The manual control or actuation of the parking brake control elements takes place within the scope of this invention by actuation by the vehicle driver by hand. It is also important to mention in this context that when the above-mentioned parking brake supply lines are in a deaerated state, the spring-loaded brake cylinders of a towing vehicle parking brake device and a trailer parking brake device are activated or tensioned. Accordingly, when the above-mentioned parking brake supply lines are in a deaerated state, the spring-loaded brake cylinders of a towing vehicle parking brake device and a trailer parking brake device are released or deactivated. The corresponding parking brake supply lines for the towing vehicle and trailer can be deaerated or aerated directly by the parking brake control valves or parking brake solenoid control valves. Alternatively, it can also be provided that the corresponding parking brake supply lines for the towing vehicle and trailer can be deaerated or aerated indirectly by the parking brake solenoid control valves. Accordingly, the parking brake solenoid control valves can activate a relay valve which then deaerates or aerates the parking brake supply lines. It is also conceivable that in at least one deaerated state of the towing vehicle parking brake supply line and in the actuated state of the towing vehicle parking brake control element, the towing vehicle parking brake control valve is activatable by means of the control unit in such a way that the towing vehicle parking brake supply line can be aerated by the towing vehicle parking brake control valve. Since the activation of the towing vehicle parking brake control valve and the trailer parking brake control valve by means of the control unit can be decoupled from the actual pressure conditions in the respective parking brake supply lines, a sufficient condition for activating the parking brake control valves is absolutely necessary. In this respect, feedback of the operating state of the towing vehicle parking brake supply line to the electronic control unit, for example in the form of a pressure signal, is necessary for safe and problem-free operation of the electronic parking brake device. Therefore, the towing vehicle parking brake supply line may only be deaerated under the condition that the towing vehicle parking brake supply line is in its deaerated state. The pressure signal of the towing vehicle parking brake supply line can be detected, for example, by means of a pressure sensor arranged therein and transmitted to the electronic control unit. Additionally or alternatively, a pressure signal from the trailer parking brake supply line can also be detected, for example by means of a pressure sensor arranged therein, and transmitted to the electronic control unit.

It is also conceivable that in at least one deaerated state of the trailer parking brake supply line and in the actuated state of the trailer parking brake control element, the trailer parking brake control valve is activatable by means of the control unit in such a way that the trailer parking brake supply line can be aerated by the trailer parking brake control valve. In this case as well, the activation of the towing vehicle parking brake control valve and the trailer parking brake control valve by means of the control unit can be decoupled from the actual pressure conditions in the respective parking brake supply lines. Thus, in this case also, at least one sufficient condition is required for activating the parking brake control valves in terms of overall vehicle safety. In this respect, feedback of the operating state of the trailer parking brake supply line to the electronic control unit, for example in the form of a pressure signal, is necessary for safe and problem-free operation of the electronic parking brake device. Therefore, the trailer parking brake supply line may only be deaerated under the condition that the trailer parking brake supply line is in its deaerated state.

It is also possible that in at least one aerated state of the towing vehicle parking brake supply line and the trailer parking brake supply line and in the actuated state of the towing vehicle parking brake control element, the trailer parking brake control valve and the towing vehicle parking brake control valve are activatable by means of the control unit in such a way that the trailer parking brake supply line can be deaerated by the trailer parking brake control valve and the towing vehicle parking brake supply line can be deaerated by the towing vehicle parking brake control valve. In this case as well, the activation of the towing vehicle parking brake control valve and the trailer parking brake control valve by means of the control unit can be decoupled from the actual pressure conditions in the respective parking brake supply lines. Thus, in this case as well, at least one sufficient condition is required for activating the parking brake control valves in terms of overall utility vehicle safety. Consequently, activation of the towing vehicle and trailer parking brake control valve by means of the control unit (in response to an actuating signal from the towing vehicle parking brake control element) and the resulting deaeration of the parking brake supply lines may only take place under the condition that both parking brake supply lines are in their respective deaerated state.

Furthermore, it can be provided that in the aerated state of the trailer parking brake supply line and in the actuated state of the trailer parking brake control element, the trailer parking brake control valve is activatable by means of the control unit in such a way that the trailer parking brake supply line can be deaerated by the trailer parking brake control valve. As already explained above, the activation of the towing vehicle parking brake control valve and the trailer parking brake control valve by means of the control unit can be decoupled from the actual pressure conditions or operating states in the respective parking brake supply lines. Thus, in this case as well, at least one sufficient condition is required for activating the parking brake control valves in terms of overall vehicle safety. In this respect, feedback of the operating state of the trailer parking brake supply line to the electronic control unit, for example in the form of a pressure signal, is also necessary for safe and problem-free operation of the electronic parking brake device. Therefore, the trailer parking brake supply line may only be deaerated under the condition that the trailer parking brake supply line is in its aerated state.

It is also conceivable that the towing vehicle parking brake control element and the trailer parking brake control element are connected to the control unit by means of at least one, in particular bidirectional, bus data connection. The bus data connection can in particular be designed as a CAN data bus connection or a LIN data bus connection. Other data bus connections are also conceivable in this context. The connection by means of a bus system represents a safe, standardized, and cost-effective form of transmission of the actuating signals from the control elements for the towing vehicle and trailer brakes to the electronic control unit. This, in particular bidirectional, connection also allows, in particular, the transmission of the operating states of the respective parking brake supply lines to the control elements, so that an even easier assignment of the actuated state to the respective operating state of the parking brake device is possible. As a result, manual actuation of the electronic parking brake device can still take place safely. It is also conceivable that the towing vehicle parking brake control element and the trailer parking brake control element are connected to the control unit by means of at least one monodirectional bus data connection.

In addition, it is conceivable that the towing vehicle parking brake control element and the trailer parking brake control element are designed as a common structural unit. The design of a common structural unit saves space in particular within the vehicle driver's cab or within the dashboard of the utility vehicle. In addition, electrical supply and data bus lines can be functionally combined, which, on the one hand, reduces the circuit complexity and, on the other hand, allows the number of cables or electrical connections to be reduced in general. In addition, the production of the electrical towing vehicle parking brake control element and the electrical trailer parking brake control element is simplified.

It is also possible for the structural unit to have at least one electronic sub-control unit. This sub-control unit enables the implementation of a data bus system and thus the communication with the actual electronic control unit having the two manual control elements in a particularly simple manner. Moreover, a redundant checking point can be provided which, in addition to the electronic control unit of the electronic parking brake device, can compare the status of the parking brake supply lines to the desired control signal of the control elements. As a result, a redundant functional safeguard can be produced, as a result of which the overall safety of the electronic parking brake device and of the utility vehicle is further increased.

In addition, it can be provided that the towing vehicle parking brake control valve and/or the trailer parking brake control valve are designed as electrically activatable 3/2-way valves. Basically, a 3/2-way valve represents the functionally and structurally simplest option for aerating and deaerating a compressed air line by activating it. Thus, the electronic parking brake device can be constructed in a particularly structurally and functionally very simple manner. In addition, the two 3/2-way valves can have a locking device within their control connection to maintain a switching position. In this way, in particular, the control magnet can be relieved, as a result of which the service life of the solenoid valves can be extended. In addition, the two 3/2-way valves can also be formed as a common valve assembly. Furthermore, the towing vehicle parking brake control valve can be designed as a bistable, electrically activatable 3/2-way valve. It is also conceivable that the towing vehicle parking brake control valve can be designed as a bistable, electrically activatable 2/2-way valve. Such an embodiment is particularly advantageous if the towing vehicle parking brake control valve is part of the towing vehicle parking brake control valve arrangement. In addition, the trailer parking brake control valve can be designed as a bistable, electrically activatable 3/2-way valve. Furthermore, the trailer parking brake control valve can be designed as a bistable, electrically activatable 2/2-way valve. Such an embodiment is particularly advantageous when the trailer parking brake control valve is part of the trailer parking brake control valve arrangement. Furthermore, it can be provided that the control unit is connected to at least one vehicle status detection unit for generating at least one vehicle status signal. It can also be provided that the towing vehicle parking brake control valve and/or the trailer parking brake control valve can be activatable automatically by means of the control unit in response to the vehicle status signal. The vehicle status detection unit can in particular detect the standstill of the vehicle or a quasi-standstill of the utility vehicle and then generate a corresponding vehicle status signal and transmit it to the control unit. The vehicle status detection unit can be designed, for example, as a speed measuring device or can be connected thereto and determine or detect the vehicle status therefrom. For safety reasons, however, it can also be provided that the activation of the parking brake control valves or parking brake solenoid control valves by means of the control unit can only take place automatically in such a way that the towing vehicle parking brake supply line can be deaerated as a result of this activation. The parking brake devices can thus be activated or tensioned. As a result, an automatic release of the electronic parking brake device is not permitted for safety reasons.

The present invention also relates to a method for operating the above-described electronic parking brake device for a vehicle, in particular a commercial vehicle, comprising the following steps:

Activating at least one towing vehicle parking brake control valve as a function of at least one operating state of at least one towing vehicle parking brake supply line and/or at least one trailer parking brake supply line of the vehicle by manually actuating at least one electric towing vehicle parking brake control element in such a way that at least one towing vehicle parking brake supply line is deaerated or aerated; and/or activating at least one trailer parking brake control valve as a function of at least one operating state of at least one towing vehicle parking brake supply line and/or at least one trailer parking brake supply line of the vehicle by manually actuating at least one electric trailer parking brake control element in such a way that at least one trailer parking brake supply line is deaerated or aerated.

All structural and functional features linked to the above-described electronic parking brake device according to the invention and to its possible embodiments can also be provided alone or in combination in the method according to the invention for operating this electronic parking brake device and the advantages associated therewith can be achieved.

Accordingly, it is also conceivable in this sense that in at least one deaerated state of the towing vehicle parking brake supply line as a result of at least one manual transfer of the towing vehicle parking brake control element from at least one neutral state to at least one actuated state, the towing vehicle parking brake supply line is aerated.

It is also conceivable that, in at least one deaerated state of the trailer parking brake supply line as a result of at least one manual transfer of the trailer parking brake control element from at least one neutral state to at least one actuated state, the trailer parking brake supply line is aerated.

It is also possible that in at least one aerated state of the towing vehicle parking brake supply line and the trailer parking brake supply line as a result of a manual transfer of the towing vehicle parking brake control element from the neutral state to the actuated state, the towing vehicle parking brake supply line and the trailer parking brake supply line are deaerated.

Furthermore, it can be provided that in the aerated state of the trailer parking brake supply line as a result of a manual transfer of the trailer parking brake control element from the neutral state to the actuated state, the trailer parking brake supply line is deaerated.

Further details and advantages of the invention will now be explained in more detail with reference to an exemplary embodiment shown in the drawings.

DETAILED DESCRIPTION

Figure 1:
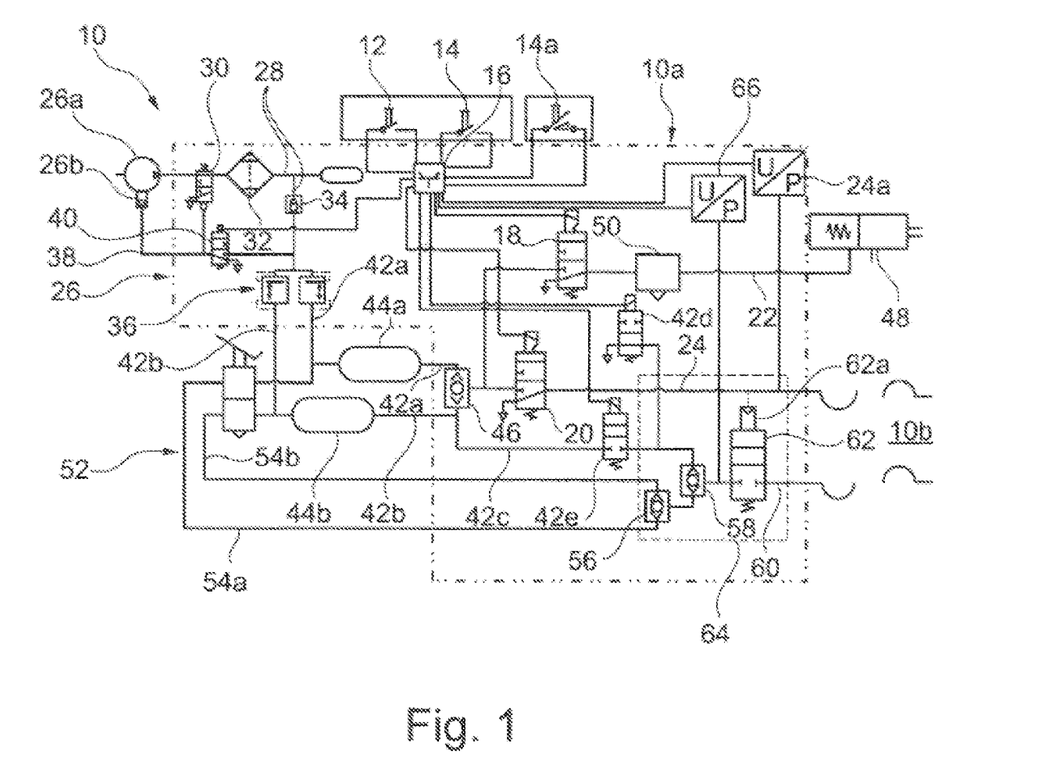
FIG. 1 shows a schematic illustration of a pneumatic circuit of an exemplary embodiment of an electronic parking brake device according to the invention.

FIG. 1 shows a schematic illustration of a pneumatic circuit of an exemplary embodiment of an electronic parking brake device 10 according to the invention.

The electronic parking brake device 10 for a utility vehicle has a manually actuatable, electric towing vehicle parking brake control element 12.

Moreover, the electronic parking brake device 10 comprises a manually actuatable, electric trailer parking brake control element 14.

The towing vehicle parking brake control element 12 is designed in particular as a partially yellow-colored parking brake control element.

The trailer parking brake control element 14 is designed in particular as a partially red-colored parking brake control element.

The two control elements 12, 14 are preferably designed as monostable push switches or push buttons.

Alternatively, these control elements 12, 14 can each or in combination also be designed as a pivotable lever, a rotary switch, a rocker switch, a linearly movable slide or a linearly movable push button, a linearly movable pull button, or a linearly movable push-pull button.

The towing vehicle parking brake control element 12 and the trailer parking brake control element 14 are formed as a common structural unit.

This structural unit is arranged on a dashboard of the utility vehicle.

The structural unit furthermore has an electronic sub-control unit.

The towing vehicle parking brake control element 12 and the trailer parking brake control element 14 each have a current-conducting actuated state and a current-blocking neutral state.

The electronic parking brake device 10 furthermore has an electronic control unit 16.

The control unit 16 can also be designed as a control and regulating unit.

The control unit 16 can also be designed only as a regulating unit.

The control unit 16 can furthermore have a time switching element (not shown in FIG. 1) having a settable activation period.

The towing vehicle parking brake control element 12 and the trailer parking brake control element 14 are connected to the control unit 16 via the sub-control unit by means of a bidirectional bus data connection.

The control unit 16 can furthermore be connected to or have a vehicle status detection unit (not shown in FIG. 1) for generating a vehicle status signal via the above-described bus data connection.

The bus data connection is designed as a CAN bus data connection.

Furthermore, it is also conceivable that the bus data connection is designed as a LIN bus data connection.

The electronic parking brake device 10 furthermore includes a pneumatic towing vehicle parking brake solenoid control valve 18 and a pneumatic trailer parking brake solenoid control valve 20.

The towing vehicle parking brake solenoid control valve 18 is designed as an electrically activated 3/2-way solenoid valve.

In addition, the trailer parking brake solenoid control valve 20 is also designed as an electrically activated 3/2-way solenoid valve.

The two 3/2-way solenoid valves 18, 20 each have a locking device within their solenoid control connection for maintaining a switching position.

Alternatively, the two 3/2-way solenoid valves 18, 20 can also be designed as a common valve assembly.

Moreover, the electronic parking brake device 10 has a towing vehicle parking brake supply line 22 and a trailer parking brake supply line 24.

According to FIG. 1, the electronic parking brake device 10 comprises an air processing device 26.

In the same way it can also be provided that the electronic parking brake device 10 and the air processing device 26 are designed as separate units and are connected to one another via corresponding compressed air connections.

The compressed air processing device 26 is connected to a compressed air compressor 26a via a main supply line 28.

Furthermore, a regeneration valve 30 and an air dryer cartridge 32 having a combined air filter and a check valve 34 are arranged in the main supply line 28.

The main supply line 28 is connected to a multi-circuit protection valve 36, shown here by way of example as a two-circuit protection valve.

A compressor feedback line 38 branches off between the check valve 34 and the multi-circuit protection valve 36 and is connected to a compressor control input 26b.

A compressor solenoid control valve 40, which is electrically connected to the control unit 16, is furthermore arranged in the compressor feedback line 38.

The multi-circuit protection valve 36 is connected via two compressed air lines 42a, 42b to two compressed air tanks 44a, 44b for its compressed air supply.

The two compressed air lines 42a, 42b unify via a first select high valve 46 to form the trailer parking brake supply line 24.

The trailer parking brake solenoid control valve 20 is also arranged in the trailer parking brake supply line 24.

The trailer parking brake supply line 24 extends between the first select high valve 46 and a first coupling head, which pneumatically connects the towing vehicle to the trailer vehicle.

The towing vehicle parking brake supply line 22 branches off between the first select high valve 46 and the trailer parking brake solenoid control valve 20 and extends up to a towing vehicle spring-loaded brake cylinder 48.

The towing vehicle spring-loaded brake cylinder 48 is shown according to FIG. 1 as a single towing vehicle spring-loaded brake cylinder 48, wherein the electronic parking brake device 10 can of course have multiple (e.g., two, four, or six etc.) towing vehicle spring-loaded brake cylinders 48.

The towing vehicle parking brake solenoid control valve 18 is also arranged in the towing vehicle parking brake supply line 22.

In the towing vehicle parking brake supply line 22, a relay valve 50 having a control input (not shown in FIG. 1) is furthermore arranged between the towing vehicle parking brake solenoid control valve 18 and the towing vehicle spring-loaded brake cylinder 48.

The relay valve 50 also has a pneumatic control input which is pneumatically activatable via a control line (not shown in FIG. 1 in each case).

The control line is connected to the towing vehicle parking brake supply line 22 and branches off between the select high valve 46 and the towing vehicle parking brake solenoid control valve 18.

Alternatively, it is conceivable that the control line branches off from the towing vehicle parking brake supply line 22 between the towing vehicle parking brake solenoid control valve 18 and the relay valve.

Additionally or alternatively, it is conceivable that a further relay valve of this type having a corresponding control line (not shown in FIG. 1 in each case) is arranged in the trailer parking brake supply line 24.

According to a further exemplary embodiment, it can also be provided that the towing vehicle parking brake solenoid control valve 18 is arranged in this control line.

A first pressure sensor 24a is also arranged within the trailer parking brake supply line 24 between the trailer parking brake solenoid control valve 20 and the first coupling head.

In addition, a second pressure sensor (not shown in FIG. 1) can be arranged within the towing vehicle parking brake supply line 22 between the towing vehicle parking brake solenoid control valve 18 and the spring-loaded brake cylinder 48.

In addition to the electronic parking brake device 10, a service brake device 52 is also provided according to FIG. 1, which is connected to the two compressed air tanks 44a, 44b.

The service brake supply lines 54a, 54b branching off from the two compressed air lines 42a, 42b are connected to a trailer service brake supply line 60 via a second and a third select high valve 56, 58.

The trailer service brake supply line 60 extends between the third select high valve 58 and a second coupling head, which also pneumatically connects the towing vehicle to the trailer vehicle.

In the trailer service brake supply line 60, a shut-off valve 62 is furthermore arranged, which is designed as a 2/2-way valve having passage and blocking positions.

The shut-off valve 62 moreover comprises a pneumatic control input 62a, which is connected to the trailer parking brake supply line 24.

The two select high valves 56, 58 and the shut-off valve 62 together form a towing vehicle protection valve structural unit 64.

A third pressure sensor 66 is also arranged within the trailer service brake supply line 60 between the third select high valve 58 and the shut-off valve 62.

Between the second compressed air tank 44b and the first select high valve 46, a bypass line 42c branches off from the compressed air line 42b and extends to the third select high valve 58, where it is connected to it.

In the bypass line 42c, a first and second anti-jackknifing solenoid control valve 42d, 42e are also arranged, which are connected to the control unit 16 via a respective electrical connection.

In addition, an anti-jackknifing control element 14a is provided, which furthermore has a displacement sensor for generating an anti-jackknifing control signal that is dependent on the deflection of the anti-jackknifing control element 14a, in particular a proportional anti-jackknifing control signal.

The anti-jackknifing control element 14a can be designed as a pivotable lever.

Alternatively, the anti-jackknifing control element 14a can also be designed as a rotary switch, rocker switch, linearly movable slide or linearly movable pushbutton, linearly movable pull button, or linearly movable push-pull button.

The function of the electronic parking brake device according to the invention according to FIG. 1 may now be described as follows:

First, the electronic parking brake device 10 is configured with respect to the basic concept according to the invention for the purpose of, as a function of an operating state of the towing vehicle parking brake supply line 22 and the trailer parking brake supply line 24, activating the towing vehicle parking brake solenoid control valve 18 and the trailer parking brake solenoid control valve 20.

In general, this type of control can take place in such a way that, by manual actuation of the towing vehicle parking brake control element 12, the towing vehicle parking brake solenoid control valve 18 is activated by means of the control unit 16 in such a way that the towing vehicle parking brake supply line 22 is deaerated or aerated by the towing vehicle parking brake solenoid control valve 18.

The actual deaeration or aeration of the towing vehicle parking brake supply line 22 takes place by means of the relay valve 50, the control input of which is activated pneumatically by the electrically activatable towing vehicle parking brake solenoid control valve 18.

It is also conceivable in this context that by manual actuation of the trailer parking brake control element 14, the trailer parking brake solenoid control valve 20 is activated by means of the control unit 16 in such a way that the trailer parking brake supply line 24 is also deaerated or aerated by the trailer parking brake solenoid control valve 20.

The deaeration of the towing vehicle parking brake supply line 22 requires actuating or tensioning of the towing vehicle spring-loaded brake cylinder 48, whereas aeration of the towing vehicle parking brake supply line 22 correspondingly causes the towing vehicle spring-loaded brake cylinder 48 to be released or relaxed.

Therefore, deaerating the trailer parking brake supply line 24 causes the trailer spring-loaded brake cylinder (not shown in FIG. 1) to be actuated or tensioned, whereas aerating the trailer parking brake supply line 24 correspondingly causes the trailer spring-loaded brake cylinder to be released or relaxed.

According to the invention, the activation takes place by manual actuation of the two parking brake control elements in the form of the towing vehicle parking brake control element 12 and the trailer parking brake control element 14.

Therefore, there is a clear and unambiguous association between the towing vehicle parking brake control element 12 and the corresponding activation of the electronic towing vehicle parking brake device 10a and the trailer parking brake control element 14 and the corresponding activation of the electronic trailer parking brake device 10b.

To control these two parking brake solenoid control valves 18, 20, the towing vehicle parking brake control element 12 and the trailer parking brake control element 14 each have a current-conducting actuated state and a current-blocking neutral state.

The current-conducting actuated state or activated state should be understood to mean that a corresponding parking brake control signal is generated and transmitted to the electronic control unit 16.

In response to this parking brake control signal, the control unit can then take over the activation of the two parking brake solenoid control valves 18, 20.

The current-blocking neutral state can accordingly be understood to mean that no parking brake control signal is generated in this neutral state and, accordingly, the two parking brake solenoid control valves 18, 20 are not activated.

This type of activation is more intuitive and easier to effectuate for a vehicle driver due to the functionally separate activation, so that the operational reliability for the electronic parking brake device 10 improves as a result.

In addition, according to a further exemplary embodiment (not shown in FIG. 1), it is conceivable that the control elements 12, 14 are activated in the pulling and/or pushing direction (push-pull) to bring about the actuated state.

In this embodiment, the two control elements 12, 14 would each have a neutral position for bringing about the respective neutral state and two actuated positions for bringing about the respective actuated state.

The two actuated positions can be brought about in opposite directions by pushing and pulling on the two control elements 12, 14, wherein the neutral position is arranged between the two actuated positions.

The two control elements 12, 14 would also be designed as monostable in this example having the neutral position as the stable position.

Of course, in this context it is also conceivable that the two control elements 12, 14 are also designed as bistable control elements 12, 14 (also not shown in FIG. 1).

Multiple switching scenarios are conceivable for activating the two parking brake solenoid control valves 18, 20 by means of the towing vehicle parking brake control element 12 and the trailer parking brake control element 14 and by means of the control unit 16, which are described below:

According to a first switching scenario, in a deaerated state of the towing vehicle parking brake supply line 22 and in the actuated state of the towing vehicle parking brake control element 12, the towing vehicle parking brake solenoid control valve 18 is activated by means of the control unit 16.

The deaerated state and the aerated state of the towing vehicle parking brake supply line 22 and the trailer parking brake supply line 24 can be detected by the two pressure sensors based on a corresponding pressure signal in the towing vehicle parking brake supply line 22 and in the trailer parking brake supply line 24 and transmitted to the control unit 16.

Correspondingly, the deaerated state and the aerated state of the trailer parking brake supply line 24 are detected and transmitted to the control unit 16 by means of an aerated state pressure signal in the same way.

The activation takes place in such a way that, in response to the control signal from the towing vehicle parking brake control element 12, the control unit 16 activates the towing vehicle parking brake solenoid control valve 18 such that the towing vehicle parking brake supply line 22 is aerated by the towing vehicle parking brake solenoid control valve 18.

The aeration takes place in a passage position of the towing vehicle parking brake solenoid control valve 18.

In a second switching scenario, in a deaerated state of the trailer parking brake supply line 24 and in the actuated state of the trailer parking brake control element 14, the trailer parking brake solenoid control valve is activated by means of the control unit 16.

The activation takes place in such a way that the trailer parking brake supply line 24 is aerated by the trailer parking brake solenoid control valve by means of the control unit 16.

The activation according to the second switching scenario takes place in principle as in the first switching scenario.

With regard to a third switching scenario, in an aerated state of each of the towing vehicle parking brake supply line 22 and the trailer parking brake supply line 24 and in the actuated state of the towing vehicle parking brake control element 12, the trailer parking brake solenoid control valve 20 and the towing vehicle parking brake solenoid control valve 18 are activated by means of the control unit 16.

The activation also takes place here in such a way that the trailer parking brake supply line 24 is deaerated by the trailer parking brake solenoid control valve 20 and the towing vehicle parking brake supply line 22 is deaerated by the towing vehicle parking brake solenoid control valve 18 by means of the control unit 16.

The deaeration takes place in a respective deaeration position of the towing vehicle parking brake solenoid control valve 18 and the relay valve 50 as well as the trailer parking brake solenoid control valve 20.

In this deaeration position, the respective trailer parking brake supply line 24 and the towing vehicle parking brake supply line 22 are deaerated via the respective deaeration outlets of the relay valve 50 and the trailer parking brake solenoid control valve 20.

The activation according to the third switching scenario takes place in principle as in the first and second switching scenario.

According to a fourth switching scenario, in the aerated state of the trailer parking brake supply line 24 and in the actuated state of the trailer parking brake control element 14, the trailer parking brake solenoid control valve 20 is activated by means of the control unit 16 in such a way that the trailer parking brake supply line 24 is deaerated by the trailer parking brake solenoid control valve 20.

The activation according to the fourth switching scenario takes place in principle as in the first, second, and third switching scenario.

The utility vehicle can also have an optical display device on its dashboard in the vicinity of the two parking brake control elements 12, 14, which displays to the driver the current operating state of the towing vehicle parking brake device and the trailer parking brake device.

The optical display device can be provided in the form of multiple illuminated symbols, LEDs, or in the form of an electronic display.

Other automatic or partially automatic switching scenarios are also conceivable.

First, the electronic parking brake device 10 is furthermore configured such that the towing vehicle parking brake solenoid control valve 18 is activatable by means of the control unit 16 in such a way that the towing vehicle parking brake supply line 22 can be deaerated by the towing vehicle parking brake solenoid control valve 18 and at the same time a beginning of the activation period of the time switching element is activatable.

The activation of the towing vehicle parking brake solenoid control valve 18 can in principle also take place automatically or partially automatically with the interaction of the two manual control elements.

The automatic activation of the towing vehicle parking brake solenoid control valve 18 accordingly takes place by means of the control unit 16 in response to a vehicle status signal.

As a result, the automated activation can only take place when the vehicle status signal has been transmitted to the control unit 16 by the driving status detection device.

Within the activation period, the trailer parking brake solenoid control valve 20 is activatable by means of the control unit 16 in response to the actuated state of the trailer parking brake control element 14 in such a way that the trailer parking brake supply line 24 can furthermore be aerated by the trailer parking brake solenoid control valve 18.

The operating state resulting therefrom for the utility vehicle is that the towing vehicle parking braking system is tensioned or activated, while the trailer parking braking system continues to be released or remains in the relaxed state.

This operating state can also be used to carry out a so-called trailer test when the trailer parking brake control element 14 is actuated within the above-described activation period.

The trailer parking braking system thus remains in a released state even after the end of the activation period, which can then be ended by manually bringing about the actuated state again by means of the trailer parking brake control element 14 and the trailer parking braking system can be activated accordingly.

In order to be able to carry out the above-described activation, the towing vehicle parking brake supply line 22 and the trailer parking brake supply line 24 are each in their aerated state before the manual actuation of the towing vehicle parking brake control element 12 or before the automatic activation by means of the control unit 16.

This state of the two parking brake supply lines 22, 24 for the first time enables a so-called trailer overwrite function or trailer cancellation function to be functionally implementable.

In a further function of the parking brake 10, the trailer parking brake supply line 24 can be deaerated by the trailer parking brake solenoid control valve 18 if the trailer parking brake control element 14 is in its current-blocking neutral state within the activation period.

As a result, the trailer parking brake solenoid control valve 20 is automatically activated by means of the control unit 16 in such a way that the trailer parking brake supply line 24 can be deaerated.

As a result of the deaeration, the trailer parking braking system is therefore transferred into its tensioned or activated state and can apply a braking effect for the trailer.

Furthermore, the utility vehicle can be operated temporarily in an anti-jackknifing state.

For this purpose, the anti-jackknifing control element 14a is manually actuated by a vehicle driver and a corresponding anti-jackknifing control signal proportional to the deflection of the anti-jackknifing control element 14a is generated.

This signal can then be processed further by the control unit 16 and the two anti-jackknifing valves 42d, 42e can be activated to generate the anti-jackknifing function.

The manual control or actuation of the anti-jackknifing control element 14a takes place within the scope of this invention by actuation by the vehicle driver by hand.

Figure 2:
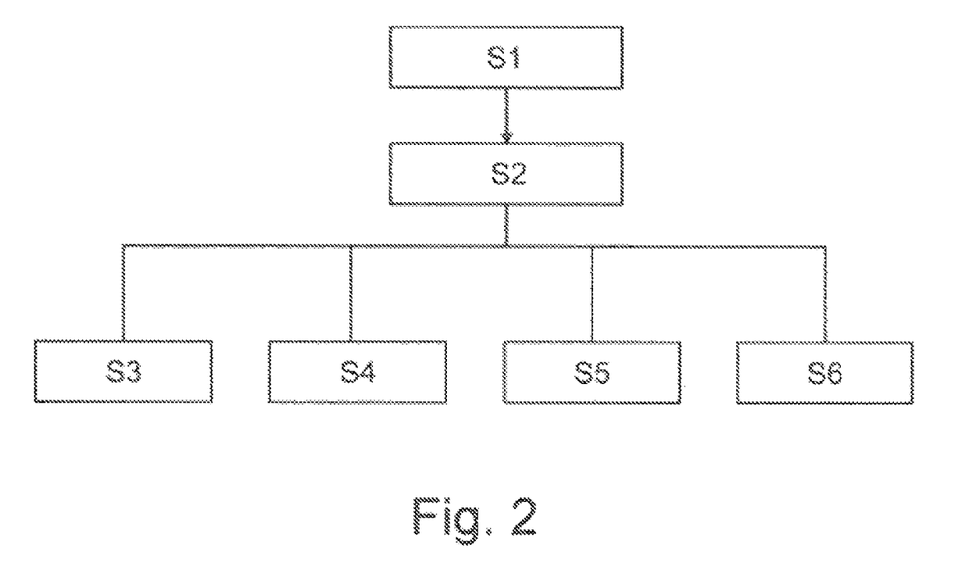
FIG. 2 shows a schematic flow chart of an exemplary embodiment of a method according to the invention for operating the electronic parking brake device of FIG. 1.

FIG. 2 shows a schematic flow chart of an exemplary embodiment of a method according to the invention for operating the electronic parking brake device 10 according to FIG. 1.

The method for operating the electronic parking brake device 10 for a utility vehicle described above according to FIG. 1 comprises the following steps:

Activating a towing vehicle parking brake solenoid control valve 18 according to a first step S1 as a function of an operating state of a towing vehicle parking brake supply line 22 and/or a trailer parking brake supply line 24 of the utility vehicle by manual actuation of an electric towing vehicle parking brake control element 12 in such a way that a towing vehicle parking brake supply line 22 is deaerated or aerated; and activating a trailer parking brake solenoid control valve 20 as a function of an operating state of the towing vehicle parking brake supply line 22 and/or the trailer parking brake supply line 24 of the utility vehicle by manual actuation of an electric trailer parking brake control element 14 such that a trailer parking brake supply line 24 is deaerated or aerated.

According to a third step S3, the towing vehicle parking brake supply line 22 is aerated in a deaerated state of the towing vehicle parking brake supply line 22 as a result of a manual transfer of the towing vehicle parking brake control element 12 from a neutral state to an actuated state.

In a fourth step S4, the trailer parking brake supply line 24 is aerated in a deaerated state of the trailer parking brake supply line 24 as a result of a manual transfer of the trailer parking brake control element 20 from a neutral state to an actuated state.

By means of a fifth step S5, the towing vehicle parking brake supply line 22 and the trailer parking brake supply line 24 are each deaerated in an aerated state of the towing vehicle parking brake supply line 22 and the trailer parking brake supply line 24 as a result of a manual transfer of the towing vehicle parking brake control element 12 from the neutral state to the actuated state.

According to a sixth step S6, in the aerated state of the trailer parking brake supply line 24, the trailer parking brake supply line 24 is deaerated as a result of a manual transfer of the trailer parking brake control element 14 from the neutral state to the actuated state.

Above-described steps S1, S2, S3, S4, S5, and S6 can be carried out individually or in combination, in succession or in parallel with one another.

The electronic parking brake device 10 according to the invention described above in conjunction with FIG. 1 is configured in particular to carry out the above-described method according to the invention.

LIST OF REFERENCE SIGNS 10 electronic parking brake device
10a electronic towing vehicle parking brake device
10b electronic trailer parking brake device
12 electric towing vehicle parking brake control element
14 electric trailer parking brake control element
14a anti-jackknifing control element
16 electronic control unit
18 towing vehicle parking brake solenoid control valve
20 trailer parking brake solenoid control valve
22 towing vehicle parking brake supply line
24 trailer parking brake supply line
24a pressure sensor
26 air processing unit
26a air compressor
26b compressor control input
28 main supply line
30 regeneration valve
32 air dryer cartridge
34 check valve
36 multi-circuit protection valve
38 compressor feedback line
40 compressor solenoid control valve
42a compressed air line
42b compressed air line
42c bypass line
42d anti-jackknifing solenoid control valve
42e anti-jackknifing solenoid control valve
44a compressed air tank
44b compressed air tank
46 first select high valve
48 towing vehicle spring-loaded brake cylinder
50 relay valve
52 service brake device
54a service brake supply line
54b service brake supply line
56 second select high valve
58 third select high valve
60 trailer service brake supply line
62 shut-off valve
62a control input
64 towing vehicle protection valve structural unit
66 pressure sensor
S1 first step
S2 second step
S3 third step
S4 fourth step
S5 fifth step
S6 sixth step

The invention claimed is:

1. An electronic parking brake device for a vehicle, comprising:
   manually actuatable electric towing vehicle parking brake control element,
   a manually actuatable electric trailer parking brake control element,
   an electronic control unit,
   at least one pneumatic towing vehicle parking brake control valve,
   at least one pneumatic trailer parking brake control valve,
   a towing vehicle parking brake supply line, and
   a trailer parking brake supply line, wherein as a function of an operating state of the towing vehicle parking brake supply line and the trailer parking brake supply line and in response to manually actuating the towing vehicle parking brake control element, the at least one pneumatic towing vehicle parking brake control valve is activatable by the control unit in such a way that the towing vehicle parking brake supply line can be deaerated or aerated by the at least one pneumatic towing vehicle parking brake control valve; and in response to manually actuating the trailer parking brake control element, the at least one pneumatic trailer parking brake control valve is activatable by the control unit in such a way that the trailer parking brake supply line can be deaerated or aerated by the at least one pneumatic trailer parking brake control valve.

2. The electronic parking brake device according to claim 1, wherein
the towing vehicle parking brake control element and the trailer parking brake control element each have a current-conducting actuated state and a current-blocking neutral state.

3. The electronic parking brake device according to claim 2, wherein
in at least one deaerated state of the towing vehicle parking brake supply line and in the actuated state of the towing vehicle parking brake control element, the at least one pneumatic towing vehicle parking brake control valve is activatable by the control unit in such a way that the towing vehicle parking brake supply line can be aerated by the at least one pneumatic towing vehicle parking brake control valve.

4. The electronic parking brake device according to claim 1, wherein
in at least one deaerated state of the trailer parking brake supply line and in the actuated state of the trailer parking brake control element, the trailer parking brake control valve is activatable by the control unit in such a way that the trailer parking brake supply line can be aerated by the at least one pneumatic trailer parking brake control valve.

5. The electronic parking brake device according to claim 1, wherein
in at least one aerated state of the towing vehicle parking brake supply line and the trailer parking brake supply line and in the actuated state of the towing vehicle parking brake control element, the at least one pneumatic trailer parking brake control valve and the at least one pneumatic towing vehicle parking brake control valve are activatable by the control unit in such a way that the trailer parking brake supply line can be deaerated by the at least one pneumatic trailer parking brake control valve and the towing vehicle parking brake supply line can be deaerated by the towing vehicle parking brake control valve.

6. The electronic parking brake device according to claim 1, wherein
in the aerated state of the trailer parking brake supply line and in the actuated state of the trailer parking brake control element, the at least one pneumatic trailer parking brake control valve is activatable by the control unit in such a way that the trailer parking brake supply line can be deaerated by the at least one pneumatic trailer parking brake control valve.

7. The electronic parking brake device-according to claim 1 wherein
the towing vehicle parking brake control element and the trailer parking brake control element are connected to the control unit by at least one bidirectional, bus data connection.

8. The electronic parking brake device according to claim 1, wherein
the towing vehicle parking brake control element and the trailer parking brake control element are designed as a common structural unit.

9. The electronic parking brake device according to claim 8, wherein the structural unit has at least one electronic sub-control unit.

10. The electronic parking brake device according to claim 1, wherein
the at least one pneumatic towing vehicle parking brake control valve and the at least one pneumatic trailer parking brake control valve are designed as electrically activatable 3/2-way valves.

11. A method for operating at least one electronic parking brake device for a vehicle, comprising the following steps:
activating at least one towing vehicle parking brake control valve as a function of an operating state of at towing vehicle parking brake supply line and at least one trailer parking brake supply line of the vehicle by manually actuating the at least one electric towing vehicle parking brake control element in such a way that the towing vehicle parking brake supply line is deaerated or aerated; and
activating at least one trailer parking brake control valve as a function of the operating state of the towing vehicle parking brake supply line and the trailer parking brake supply line of the vehicle by manually actuating at least one electric trailer parking brake control element in such a way that the trailer parking brake supply line is deaerated or aerated.

12. The method according to claim 11, wherein
in at least one deaerated state of the towing vehicle parking brake supply line, as a result of at least one manual transfer of the towing vehicle parking brake control element from at least one neutral state to at least one actuated state, the towing vehicle parking brake supply line is aerated.

13. The method according to claim 11, wherein
in at least one deaerated state of the trailer parking brake supply line, as a result of at least one manual transfer of the trailer parking brake control element from at least one neutral state to at least one actuated state, the trailer parking brake supply line is aerated.

14. The method according to claim 11, wherein
in at least one aerated state of each of the towing vehicle parking brake supply line and the trailer parking brake supply line, as a result of a manual transfer of the towing vehicle parking brake control element from the neutral state to the actuated state, the towing vehicle parking brake supply line and the trailer parking brake supply line are deaerated.

15. The method according to claim 11, wherein
in the aerated state of the trailer parking brake supply line, as a result of a manual transfer of the trailer parking brake control element from the neutral state to the actuated state, the trailer parking brake supply line is deaerated.

* * * * *